United States Patent [19]

Knyszek et al.

[11] 3,806,197

[45] Apr. 23, 1974

[54] MUDFLAP ASSEMBLY FOR A REAR DUMP VEHICLE

[75] Inventors: Edward P. Knyszek, Parma; Joseph O. Runci, Hudson, both of Ohio

[73] Assignee: General Motors Corporation, Detroit, Mich.

[22] Filed: Nov. 24, 1972

[21] Appl. No.: 309,220

[52] U.S. Cl. .......................... 298/1 SG, 280/154.5
[51] Int. Cl. ............................................. B62d 25/16
[58] Field of Search ................. 298/1 SG; 280/154.5

[56] References Cited
UNITED STATES PATENTS

| | | | |
|---|---|---|---|
| 2,981,553 | 4/1961 | Zerbe | 298/1 SG X |
| 3,580,604 | 5/1971 | Overend | 298/1 SG |
| 3,203,710 | 8/1965 | Harting | 298/1 SG |

*Primary Examiner*—Richard J. Johnson
*Attorney, Agent, or Firm*—Edward J. Biskup

[57] ABSTRACT

A mudflap assembly for use with a dump vehicle having dual tires at the rear end thereof and including a pair of flexible flap sections one of which is supported by a rigid member adjacent the dual tires and the other is located above and to the rear of the rigid member and is secured at its upper end to the dump body. The rigid member is pivotally connected to the dump body and is combined with a cable which assures that the attached flap section maintains substantially the same position when the dump body is in the lowered-carry-position or raised-dump-position.

3 Claims, 4 Drawing Figures

PATENTED APR 23 1974                    3,806,197

MUDFLAP ASSEMBLY FOR A REAR DUMP VEHICLE

This invention concerns a mudflap assembly for a vehicle and more particularly a mudflap construction which is attachable to the dump body of a dump vehicle.

In cases where mudflaps are connected to the material-retaining-body of a dump vehicle adjacent the rear wheels, it has been found that some form of mechanism must be provided for preventing the mudflaps from contacting the ground when the dump body is moved to the raised position. Otherwise, the mudflaps can become embedded in the dumped load or they may be lodged between the rear wheels and the ground and be torn from their supports when the vehicle is moved rearwardly.

Accordingly, the objects of the present invention are to provide a mudflap assembly having two flap sections normally located in longitudinally spaced vertical planes with one of the flap sections pivotally attached to the dump body in a manner so that it does not contact the ground when the dump body is moved from a lowered position to a raised-dump-position; to provide a mudflap assembly for the dump body of a dump vehicle in which the mudflap assembly is made in two separate parts with one part being attached to the dump body above and to the rear of the other part; to provide a mudflap that is pivotally attached to the underside of a dump body and is maintained in substantially the same position relative to the rear wheels when the dump body is in the lowered position or in the dump position; and to provide a mudflap assembly that includes two separate sections which are longitudinally and vertically spaced and cooperate so as to provide a shield for the rear wheels of a vehicle.

The above objects and others are realized with a mudflap assembly comprising a first flap section and a second flap section positioned adjacent the rear wheels of a dump vehicle. In the preferred form, both flap sections are made of a flexible material and the first flap section is fixedly attached at its upper end to the dump body. The second flap section is supported by a rigid member which is normally located below and forwardly of the first flap section in a predetermined position relative to the rear wheels. Means in the form of a pair of rods pivotally connect the rigid member to the dump body and a cable and roller combination serves to maintain the second flap section in the predetermined position when the dump body is moved from a lowered-carry-position to a raised-dump-position.

A more complete understanding of the invention will be derived from the following detailed description when taken with the drawings in which.

Figure 1:
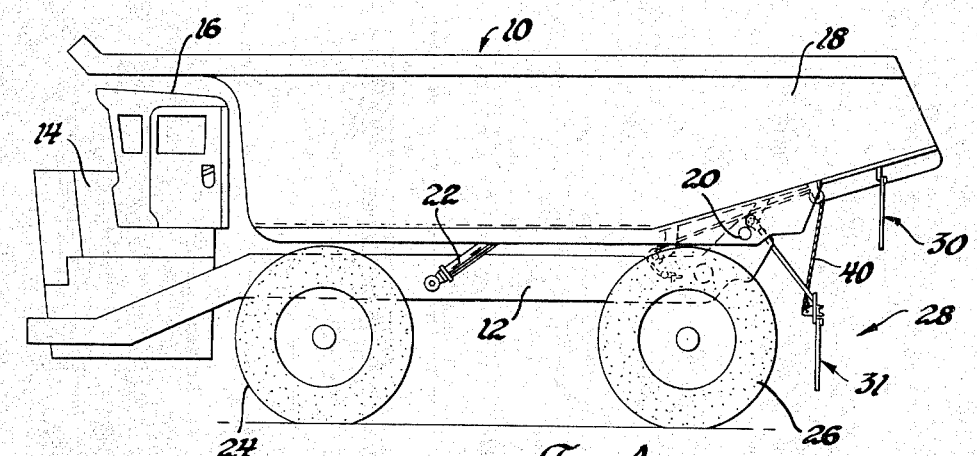
FIG. 1 is an elevational view showing a dump vehicle incorporating a mudflap assembly made according to the invention.
Figure 2:
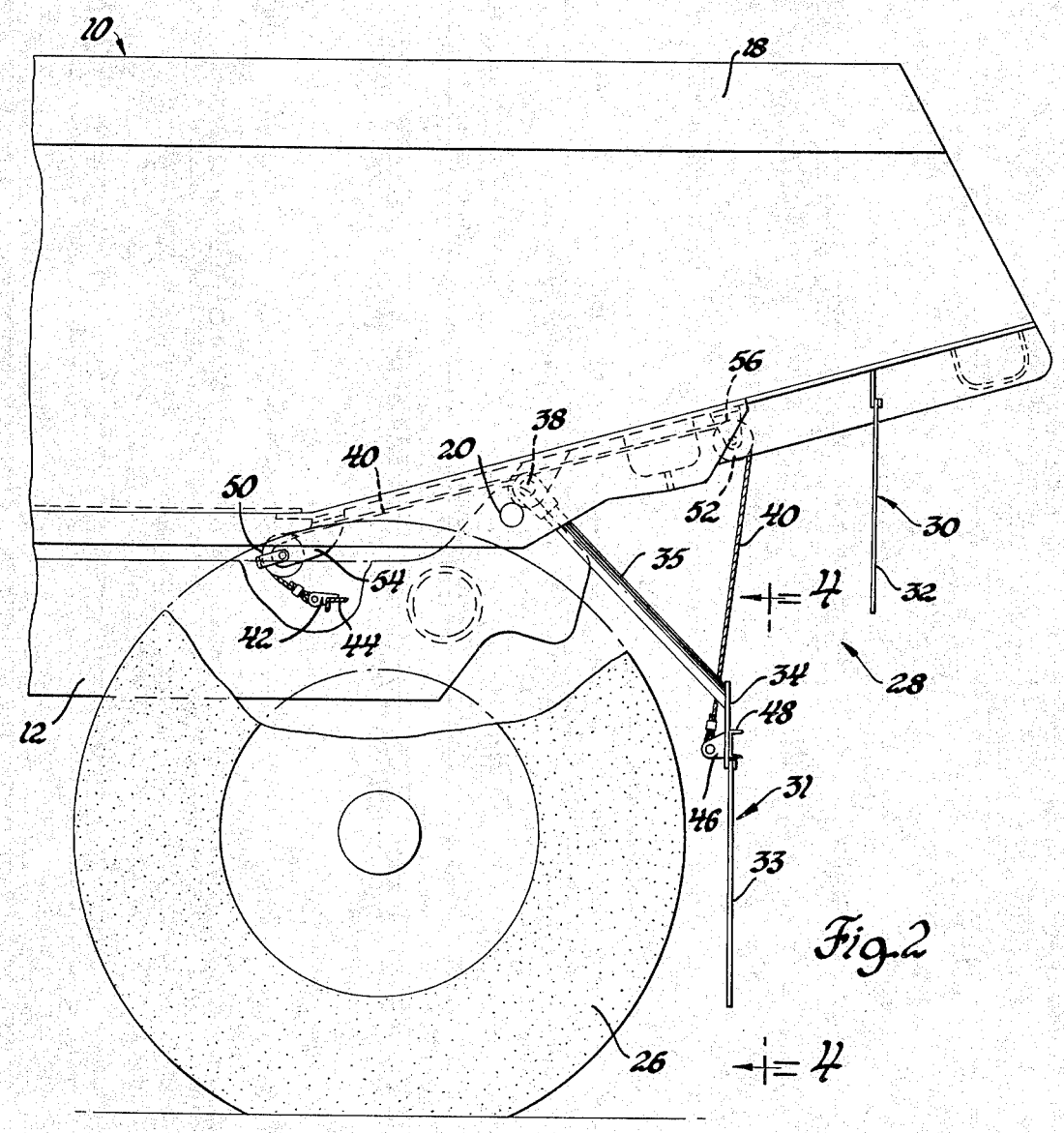
FIG. 2 is an enlarged view of the mudflap assembly shown in FIG. 1.
Figure 3:
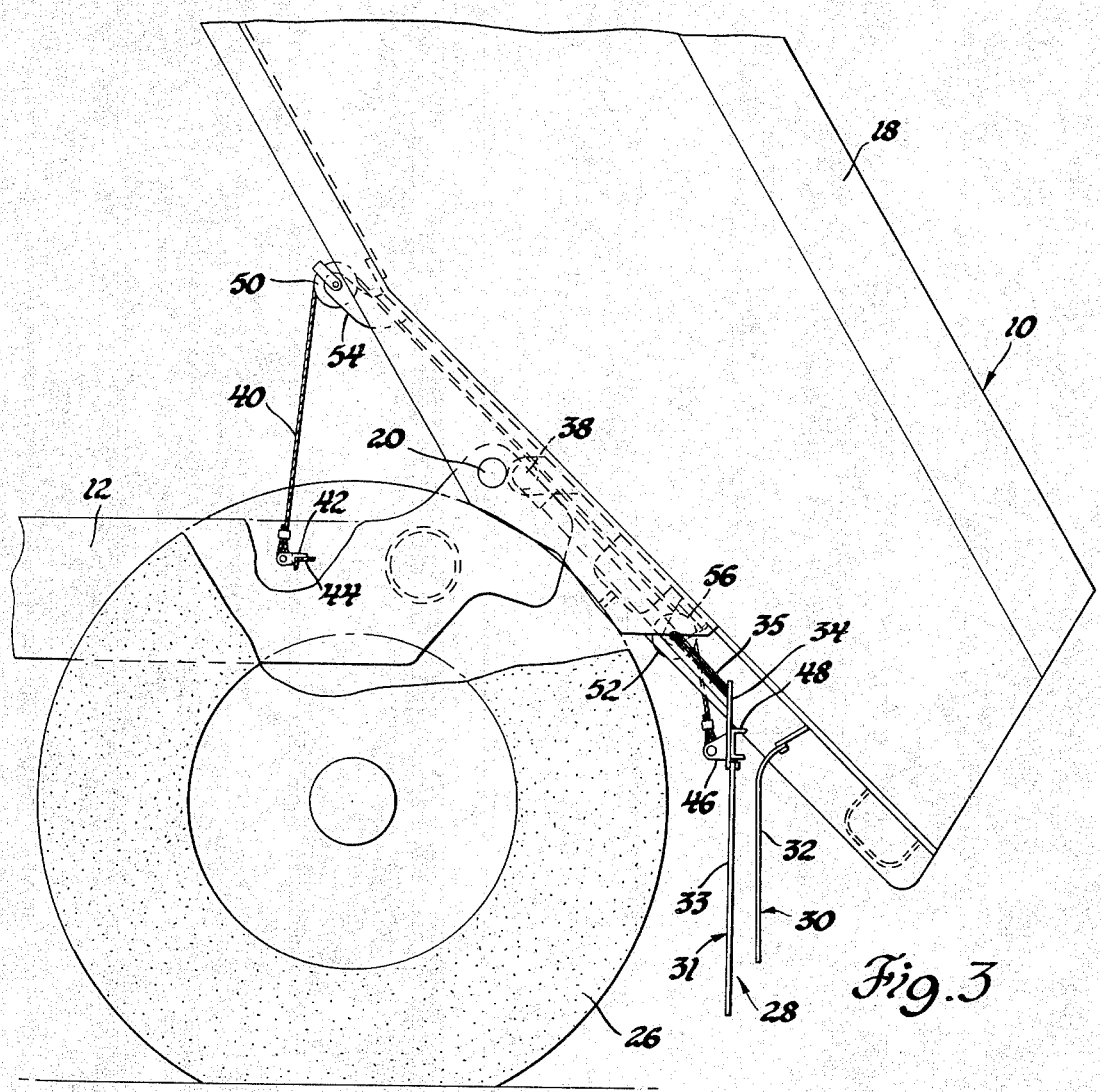
FIG. 3 is a view similar to FIG. 2 but shows the dump body in the raised-dump-position.
Figure 4:
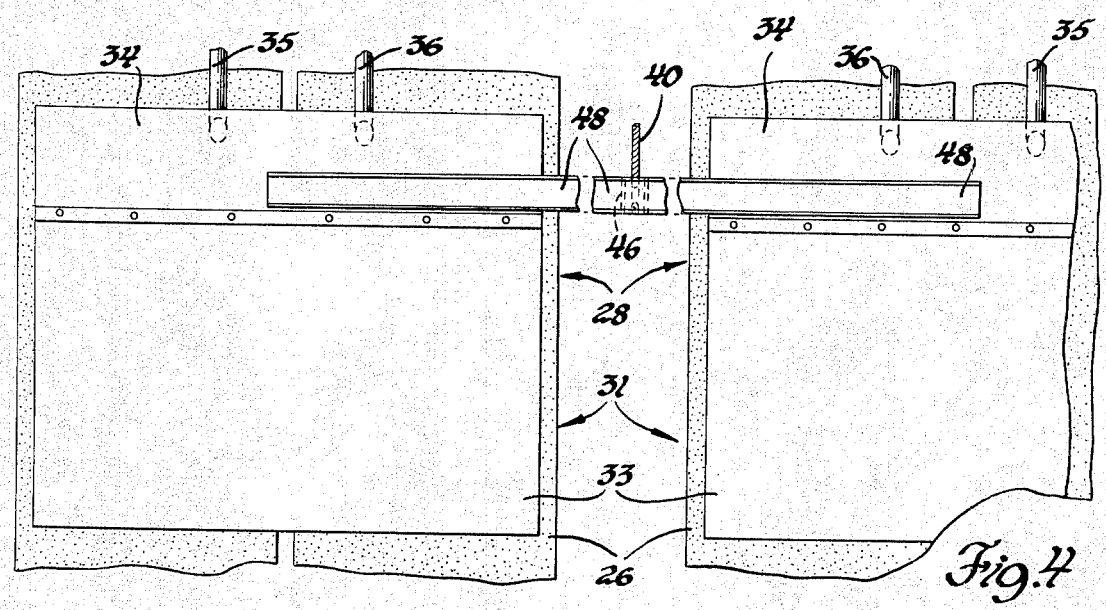
FIG. 4 is an end view of the mudflap assembly taken on lines 4—4 of FIG. 2.

Referring to the drawings and more particularly FIGS. 1 and 2 thereof, an off-highway rear dump vehicle 10 is shown having a frame 12 the forward end of which is provided with the usual engine compartment 14 and an operator's cab 16. To the rear of the cab 16, the main part of the frame 12 supports a dump body 18 that is connected to the frame by a pivotal connection 20. As shown, the dump body 18 is in the lowered-carry-position and is adapted to be moved rearwardly about the pivotal connection 20 to a raised-dump-position shown in FIG. 3. The latter movement occurs by actuation of hydraulic means such as a multistage hydraulic cylinder shown in FIG. 1 and indicated by the reference numeral 22. It will be noted that the dump vehicle 10 has front steerable wheels 24 and also rear wheels 26. The rear wheels 26 are in the form of dual tires supported by a transverse axle and located on opposite sides of the frame 12 as shown in FIG. 4. In addition, a mudflap assembly 28 is carried by the rear portion of the dump body 18 and is supported by the latter to the rear of each set of dual tires.

More specifically, each mudflap assembly 28 comprises a pair of flap sections 30 and 31 which serve as a shield for the dual tires. The flap section 30 includes a rectangular portion 32 made of an elastomeric material such as rubber that is fixedly attached at its upper end to the underside of the dump body 18. The flap section 31 also includes a flexible rectangular portion 33 that is secured at its upper end to a rigid support member 34 that is connected by a pair of laterally spaced rods 35 and 36 to the dump body. In this regard, it will be noted that the rear ends of the rods 34 and 36 are rigidly secured to the support plate member 34 of the flap section 31 while the front ends are connected to the dump body 18 by a pivotal connection 38 so as to allow the flap section 31 to pivot about a transverse horizontal axis which is parallel to the pivotal axis provided by the pivotal connection 20. When the dump body 18 is in the lowered-carry-position of FIG. 2, the flap section 31 is located forwardly and below the flap section 30 so that the two flap sections cooperate to substantially shield the dual tires when viewed from the rear. As should be apparent, each flap section 30 and 31 is normally disposed in a vertical transverse plane when the dump body 18 is in the lowered-carry-position.

In order to maintain the flap section 31 in the position of FIG. 2 so as to assure that it will not be damaged during a dumping operation, a flexible cable 40 is provided the forward end of which is pivotally connected by an eye-link or the like to a bracket 42 rigid with a structural member 44 which is part of the vehicle frame 12. The other end of the cable 40 is pivotally connected by an eye-link or the like to a bracket 46, which in turn, is fixed with a cross bar 48 that extends transversely and has the opposite ends rigidly secured to the laterally spaced support plate members 34 as seen in FIG. 4. It will be noted that the intermediate part of the cable 40 is supported by a pair of rollers 50 and 52 which are rotatably mounted to the underside of the dump body by roller support brackets 54 and 56, respectively.

The operation of the mudflap assembly 28 described above is as follows: As alluded to hereinbefore, the dump body 18 is shown in the lowered-carry-position in FIGS. 1 and 2. At such time, the flap section 30 and the flap section 31 are located in longitudinally spaced transversely extending planes. When the dump body 18 is moved by the multistage cylinder 22 from the lowered-carry-position to the raised-dump-position of FIG. 3, the pivotal connection 38 rotates slightly in a clockwise direction about the pivotal connection 20 and causes the support rods 35 and 36 and the flap section 31 to be lowered a small amount towards the ground while still maintaining a vertical orientation. At the same time, the roller 50 moves about an arc having the pivotal connection 20 as its center and thereby creates a drawing action on the cable 40. Except for the slight repositioning described above, the drawing action assures that flap section 31 maintains substantially the same position it had when the dump body 18 was in the lowered position of FIG. 2. In this instance, however, flap section 30 is moved closer to section 32 and inasmuch the portion 32 of flap section 30 is made from a flexible material, it naturally bends in a counterclockwise direction due to the weight of its lower portion and assumes the position shown in FIG. 3. It should be apparent that inasmuch as both of the mudflap assemblies 28 are interconnected by the cross bar 48, both assume the position of FIG. 3 in the aforedescribed manner when the dump body 18 is raised.

Various changes and modifications can be made in this construction without departing from the spirit of the invention. Such changes and modifications are contemplated by the inventors and they do not wish to be limited except by the scope of the appended claims.

We claim:

1. A mudflap assembly for a dump vehicle having dual tires at the rear end thereof and a dump body supported adjacent said dual tires for movement between a lowered-carry-position and a raised-dump-position about a hinge axis extending transversely to the longitudinal axis of the vehicle, said mudflap assembly comprising a first section adapted to be attached at its upper end to the dump body, a second section including a rigid member adapted to be located below the first section and forwardly thereof in a predetermined position relative to said dual tires, elongated support means being angularly positioned relative to the plane of said second section so as to provide a rear end and a forward end and having the rear end thereof rigidly secured to the second section, means for pivotally connecting the forward end of said support means to said dump body adjacent said hinge axis, a cable adapted to have one end thereof connected to the dump vehicle, means connecting the other end of the cable to the second section, and roller means adapted to be carried by the dump body and cooperating with the cable for maintaining the second section in substantially said predetermined position when the dump body is moved from the lowered-carry-position to the raised-dump-position.

2. A mudflap assembly for use with a dump vehicle having dual tires at the rear end thereof and a dump body supported for movement between a lowered-carry-position and a raised-dump-position about a pivot axis extending transversely to the longitudinal axis of the vehicle, said mudflap assembly comprising a first section including a portion made of a flexible material for attachment to the dump body rearwardly of said dual tires, a second section including a rigid member and a flexible portion depending therefrom, said second section adapted to be located below the first section and forwardly thereof in a predetermined position relative to said dual tires, elongated support means having one end thereof fixedly secured to the rigid member, means for pivotally connecting the other end of said support means to said dump body, a cable, one end of said cable adapted to be connected to the dump vehicle, means connecting the other end of said cable to the support member, and roller means adapted to be carried by the dump body and cooperating with the cable for maintaining the second section in substantially said predetermined position when the dump body is moved from the lowered-carry-position to the raised-dump-position.

3. In combination with a rear dump vehicle having dual tires at the rear end thereof and a dump body supported adjacent said dual tires for movement about a transverse horizontal axis between a lowered-carry-position and a raised-dump-position, a mudflap assembly for shielding the rear of said dual tires, said mudflap assembly comprising a first section including a rectangular portion made of a flexible material for attachment at its upper end to the dump body at a point above and to the rear of said dual tires, a second section including a rigid support member and a flexible rectangular portion depending therefrom, said second section being normally located below the first section and forwardly thereof in a predetermined vertical position spaced rearwardly from said dual tires, rod means having the rear end thereof fixedly secured to the support member means pivotally connecting the forward end of said rod means to said dump body adjacent said horizontal axis, a cable connected at one end to the dump vehicle and connected at the other end to the second section, and a pair of rollers mounted on the dump body fore and aft of said horizontal axis and cooperating with the cable for maintaining the second section in substantially said predetermined position when the dump body is moved from the lowered-carry-position to the raised-dump-position.

* * * * *